(12) United States Patent
Vieira Formenti

(10) Patent No.: US 7,595,619 B2
(45) Date of Patent: Sep. 29, 2009

(54) FEED-FORWARD CIRCUIT FOR ADJUSTABLE OUTPUT VOLTAGE CONTROLLER CIRCUITS

(75) Inventor: Jose Antonio Vieira Formenti, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 461 days.

(21) Appl. No.: 11/210,235

(22) Filed: Aug. 23, 2005

(65) Prior Publication Data

US 2007/0053212 A1    Mar. 8, 2007

(51) Int. Cl.
G05F 1/40    (2006.01)
(52) U.S. Cl. ..................................... 323/282
(58) Field of Classification Search ............... 323/223, 323/225, 268, 271, 282, 285
See application file for complete search history.

(56) References Cited

U.S. PATENT DOCUMENTS

| 5,959,853 | A | 9/1999 | Kos |
| 6,297,620 | B1 | 10/2001 | Goodrich, II |
| 6,529,073 | B1 | 3/2003 | Highfill, III et al. |
| 6,828,766 | B2* | 12/2004 | Corva et al. .................. 323/284 |
| 6,972,974 | B2* | 12/2005 | Inn et al. ...................... 363/89 |
| 6,975,099 | B2* | 12/2005 | Wu et al. ..................... 323/280 |
| 7,176,668 | B2 | 2/2007 | Oswald et al. |
| 7,202,652 | B2* | 4/2007 | Umemoto et al. ........... 323/284 |
| 7,218,083 | B2 | 5/2007 | Wang et al. |

* cited by examiner

*Primary Examiner*—Matthew V Nguyen
(74) *Attorney, Agent, or Firm*—John J. Patti; Wade J. Brady, III; Frederick J. Telecky, Jr.

(57) ABSTRACT

A feedback loop in a variable power supply has an adjustable response speed based on operating conditions of the power supply. The response speed can be increased upon encountering a transient to improve response performance to the transient. A response speed control for the control loop modifies or bypasses a major low frequency pole in a compensation network in the control loop to increase response speed. The control limits fast response duration or impact with respect to the low frequency pole to avoid instability issues. The control may include counters or timers to selectively disable or enable the fast response function. The control can operate based on an error feedback signal and a reference to determine when a fast response should be applied. The resulting power supply system provides robust, well-regulated power, with fast responses to system transients.

10 Claims, 3 Drawing Sheets

FEED-FORWARD CIRCUIT FOR ADJUSTABLE OUTPUT VOLTAGE CONTROLLER CIRCUITS

BACKGROUND OF THE INVENTION

1. Field of the Invention

The present invention relates generally to a feed-forward control for power supplies used in battery chargers, and relates more particularly to a dynamic feed back control adaptive to transient events.

2. Description of the Related Art

Battery chargers for various applications including portable personal computers have been developed over the course of a number of years to improve performance characteristics while reducing size and complexity. Battery chargers are typically connected to an input power supply also used in powering an application such as a portable PC. In conventional topologies in portable end equipment, such as a portable PC, the battery charger is located in the end equipment and draws its power from an AC/DC power converter. The AC/DC converter supplies a consistent, fixed voltage to the battery charger, in addition to supplying power to the application. In this traditional topology, a power converter such as a DC-DC buck converter, located in the end equipment, is used to implement a battery charger function. In such topology control circuits, the power converter usually monitors specific system and battery pack parameters and adjusts a power converter duty cycle to obtain a desired charge current and charge voltage output. In such a DC-DC power converter, a conventional practice is to use the input voltage in a feed forward function, so that the overall loop response is optimized with respect to input line transients. The feed forward enables implementation of a higher bandwidth control loop, when compared to topologies that do not use a feed forward function.

In more recent developments, additional topologies have been developed that provide for the battery charger power stage function to be implemented by the power conversion stage already existent in the AC-DC converter/adapter. In this new topology the adapter output voltage is adjusted to obtain a desired charge current and charge voltage output. The AC-DC adapter output voltage is set as defined by an error signal sent to the adapter from the battery charge controller located in the end equipment. The charge current and charge voltage are directly proportional to the AC-DC adapter output voltage, since the relationship between the charge parameters and the adapter output is determined by ohmic drops in the path from the adapter to the battery charger. Some of the drops include sense resistors and on/off switches as indicated in FIG. 1.

In this new topology, the AC-DC adapter output voltage is adjusted to supply the system current and the battery charge current. As a result, the AC-DC adapter output will be dynamically adjusted, being increased or decreased by the control circuit, located in the end equipment, to deliver power to the system while charging the battery pack, under distinct system operating conditions and battery voltage ranges.

Locating the charger power stage in the AC-DC adapter reduces the power dissipation in the end equipment. In addition, the new configuration limits the voltage supplied by the AC-DC adapter to a value close to the battery voltage range plus ohmic drops, effectively enabling optimization of other end equipment power converter stages and improving overall system efficiency.

In the traditional topology, with a DC-DC converter in the end equipment, the AC-DC adapter voltage has a fixed value output. The DC-DC converter uses a traditional feed forward concept to adjust the DC-DC converter duty cycle based on input voltage variations, enabling a faster loop response. However, with the more recent adapter output voltage control topology, with a power converter in the AC-DC adapter, a traditional feed forward circuit presents several difficulties, as the AC-DC adapter voltage dynamically changes under distinct system operating conditions as defined by the control loop. The dynamic change in conjunction with the traditional feed forward circuit may generate oscillatory conditions. For instance, if the control loop is requesting an AC-DC adapter voltage output increase, i.e., an increase in duty cycle, a traditional feed forward circuit in the end equipment would prompt the control circuit to reduce the duty cycle, i.e., decrease output voltage.

Completely removing the feed forward function from the end equipment is not a viable option. Usually the AC-DC adapter power stage is implemented in a fly-back configuration, which has a very low overall loop bandwidth to be stable under distinct load conditions. As a result, removing a feed forward function produces a very slow response to system load transients, potentially resulting in long transient times with a potential for excessive charge currents being applied to the battery pack.

It would be desirable to obtain a battery charge controller circuit with a feed forward control that does not create oscillation in the output voltage. It would also be desirable to obtain a simplified means of controlling loop bandwidth and response time.

BRIEF SUMMARY OF THE INVENTION

In accordance with a preferred embodiment of the present invention, a battery charging system is provided for use with an adjustable output voltage AC-DC adapter containing a DC-DC power converter, in which the charging system includes a variable response control loop. An adapter output voltage based feed forward function is replaced with a variable bandwidth control loop function according to the present invention to provide a variable response and improve the battery charging system performance. An error signal is generated by control loops in the end equipment to indicate or command the desired adapter output. The error signal is provided to a feed forward circuit to modify the control loop response characteristics. For example, the control loop according to the present invention can be modified to have a faster response when a fast transient is detected, to help respond to the transient and quickly stabilize the system. The control loop can be returned to a slower response to provide better stability for variable loading situations, for example.

According to a feature of a preferred embodiment of the present invention, the error signal may be compared to an arbitrary reference to cause the system to switch to a fast response mode. The arbitrary reference can be a voltage level range to provide a window for determining when the fast response should be applied.

According to another aspect of a preferred embodiment of the present invention, a stability measure influences the modified response of the control loops to avoid stability problems that may be incurred with the faster response time. The stability measure can be operated as a timer or a pulse counter to obtain a time frame during which a stability indication is obtained. If a lack of stability is determined, the stability measure can be used to turn off the faster response time in the control loop to return the variable bandwidth control loop to a more stable mode of operation.

According to another aspect of a preferred embodiment of the present invention, the stability of the control loop is measured with respect to convergence to a desired point indicated by the width of a pulse. A timer or pulse counter may be used to determine an interval or number of resets that may occur in a short time frame that influence the operation of the control loop with respect to providing a faster response time. If the system operates in a range that converges to a desired steady state, the faster response aspect of the control loop may be disengaged to permit a more stable and slower response control circuit to operate. If the system is exposed to a large transient, the fast response time configuration may be applied repeatedly to obtain convergence, based on measurements taken over the interval or number of counts.

According to another feature of a preferred embodiment of the present invention, the control loop is placed in a fast response mode by bypassing a significant low frequency pole provided in a compensation network of the control loop. The low frequency pole can be bypassed until the error signal falls within a desired range or steady state value, for example.

According to another aspect of a preferred embodiment of the present invention, a feedback control system for a power supply is provided. The system comprises a feedback signal indicative of one or more parameters in the power supply for indicating operational conditions; a compensation circuit coupled to the feedback signal and operable to condition the feedback signal to provide a power supply feedback control signal; a response speed control circuit coupled to a parametric signal indicative of an operating condition of the power supply, and coupled to the compensation circuit and being operable to influence the compensation circuit to modify a response speed of the compensation circuit whereby the feedback control loop for the power supply has a modified response speed.

According to another aspect of a preferred embodiment of the present invention, the parametric signal is the feedback signal.

According to another aspect of a preferred embodiment of the present invention, the feedback signal is indicative of a transient when a transient occurs during operation of the power supply.

According to another aspect of a preferred embodiment of the present invention, the response speed control circuit is operable to modify stability of the power supply feedback control loop.

According to another aspect of a preferred embodiment of the present invention, the system further comprises a switch coupled to the compensation circuit and operable by the response speed control circuit to modify a response speed of the compensation circuit.

According to another aspect of a preferred embodiment of the present invention, the operation of the switch produces a location change in a major low frequency pole in the compensation circuit.

According to another aspect of a preferred embodiment of the present invention, the system further comprises an electrical component coupled to the switch, whereby operation of the switch connects or disconnects the component to the compensation circuit.

According to another aspect of a preferred embodiment of the present invention, the electrical component is a passive element.

According to another aspect of a preferred embodiment of the present invention, response speed control circuit further comprises a reference comparison circuit operable with the parametric signal to determine if the parametric signal is beyond a given threshold.

According to another aspect of a preferred embodiment of the present invention, the reference comparison circuit includes a comparator having a reference input and a parametric signal input and an output of the comparator indicating when the parametric signal has a value beyond that of the reference value.

According to another aspect of a preferred embodiment of the present invention, the system further comprises a second comparator with a second reference input and a parametric signal input and an output of the second comparator indicating when the parametric signal has a value beyond that of the second reference signal.

According to another aspect of a preferred embodiment of the present invention, the reference comparison circuit exhibits hysteresis.

According to another aspect of a preferred embodiment of the present invention, the response speed control circuit further comprises a counter operable to indicate a number of times the response speed control circuit is active to modify the response speed of the compensation circuit.

According to another aspect of a preferred embodiment of the present invention, the counter further includes an output operable to influence the output of the response speed control circuit to disable modification of the response speed of the compensation circuit.

According to another aspect of a preferred embodiment of the present invention, the system further comprises a timer coupled to the counter and a response speed control signal, and operable to reset the counter when the response speed control signal is active for a predetermined time interval specified by the timer.

According to another aspect of a preferred embodiment of the present invention, the response speed control signal indicates a disabled state based on the counter reaching a predetermined value.

According to another aspect of a preferred embodiment of the present invention, a method for varying the response speed of a control loop in a power supply is provided. The method comprises deriving a parametric signal based on operating parameters of the power supply; determining whether the parametric signal is beyond a predetermined reference level; and modifying a response speed of a compensation circuit influencing the parametric signal based on the outcome of the determination.

According to another aspect of a preferred embodiment of the present invention, the method further comprises the step of modifying a major low frequency pole in the compensation circuit to modify the response speed of the compensation circuit.

According to another aspect of a preferred embodiment of the present invention, the method further comprises the step of disabling the response speed modification based on criteria indicative of prior response speed modification activity.

According to another aspect of a preferred embodiment of the present invention, the criteria includes a pulse count or a time interval.

According to another aspect of a preferred embodiment of the present invention, a response speed controller for a power supply control loop is provided. The controller comprises a compensation circuit in the control loop and applicable to condition a feedback signal for control of an input power converter; an electric-component selectively coupled to the compensation circuit to selectively modify a major low frequency pole location in the compensation circuit to vary a response speed of the compensation circuit; and a response speed controller operable to influence the selective coupling of the electrical component to the compensation circuit, the controller having a parametric signal input indicative of an operating condition of the power supply.

According to another aspect of a preferred embodiment of the present invention, the controller further comprises selectively coupling the electrical component to the compensation circuit modifies a stability characteristic of the power supply control loop.

BRIEF DESCRIPTION OF THE SEVERAL VIEWS OF THE DRAWINGS

The present invention will be more clearly understood from the following detailed description read in conjunction with the accompanying drawings in which.

DETAILED DESCRIPTION OF THE PREFERRED EMBODIMENTS

Figure 2:
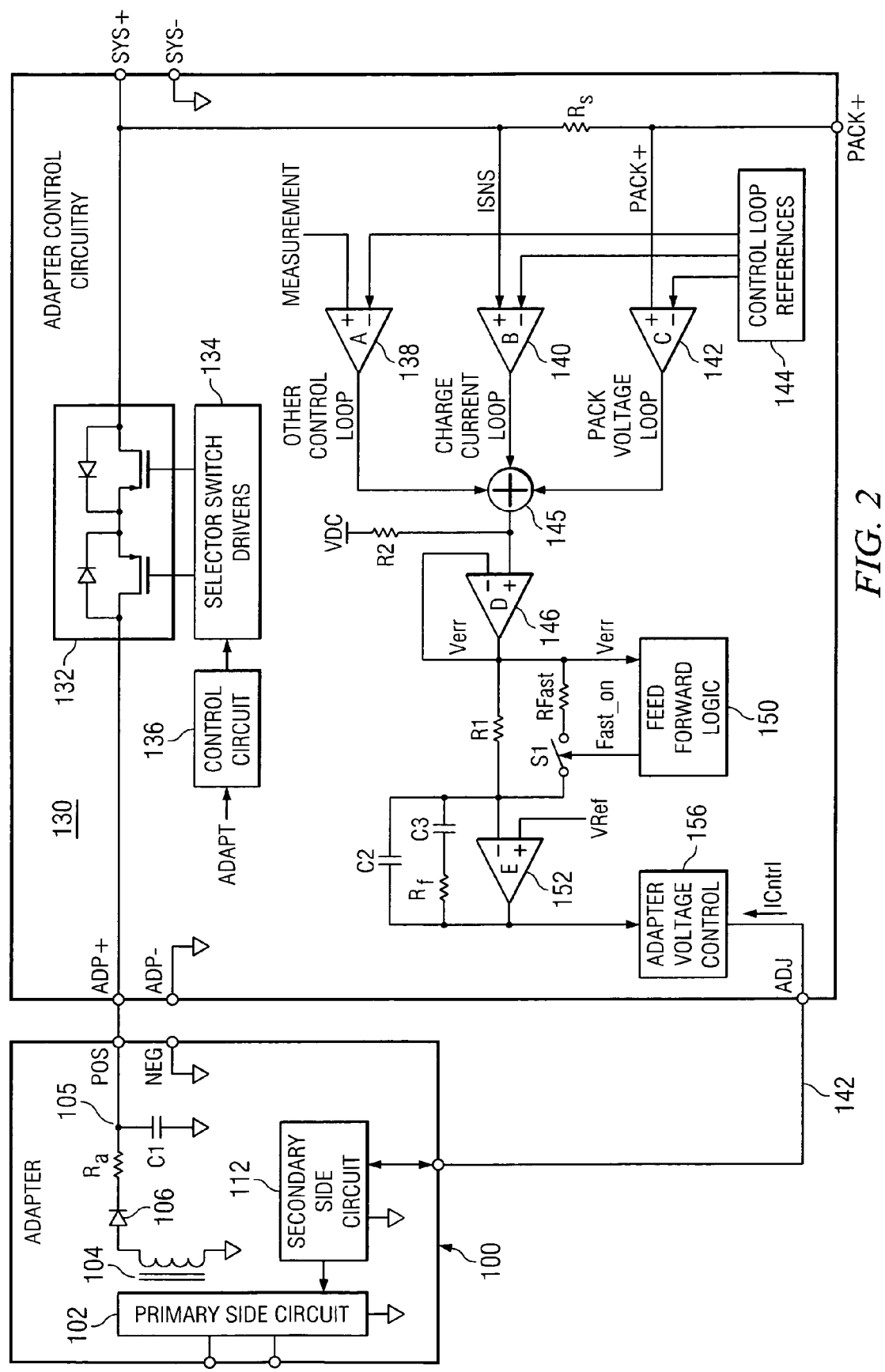
FIG. 2 is a circuit block diagram of a charge control system in accordance with the present invention.

Referring now to FIG. 2, a battery charger control system in accordance with the present invention is illustrated generally as circuit 130. Circuit 130 is connected to an adapter circuit 100, which supplies regulated DC power to charger control circuit 130. DC regulation in circuit 100 is conventionally supplied through operation of a primary side circuit 102 that typically includes a switching bridge configuration that controls energy supplied to transformer 104. Conventionally, a reading of output voltage 105 from adapter circuit 100 is used to provide adapter circuit 100 with a feedback signal to control voltage output to charge control circuit 130.

Figure 1:
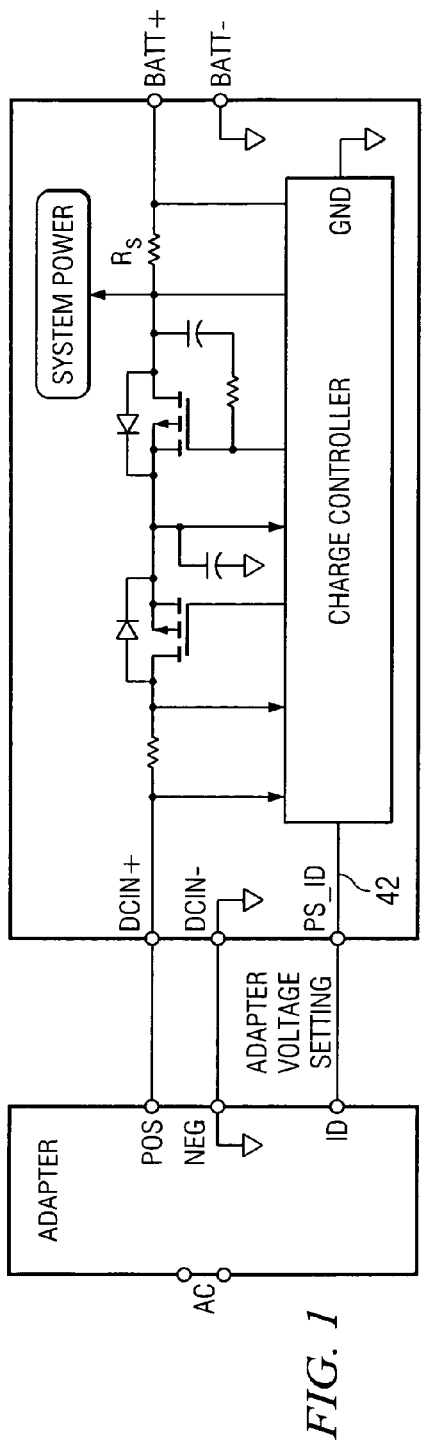
FIG. 1 is a circuit block diagram of a conventional charge control system.

In variable output power adapters an error signal is typically supplied from the controller to the adapter, such as error signal 42 indicated in FIG. 1. In accordance with the present invention, the feed forward control is provided in charge control circuitry 130. FIG. 2 illustrates the generation of error signal 142 provided from charge control circuitry 130 to adapter 100. The generation of error control signal 142 begins with measurements and comparisons in error amplifiers 140 and 142, that provide charge current loop and pack voltage loop control respectively. Other system parameters can be monitored with additions to the circuit, such as additional error amplifiers, for example. The outputs of amplifiers 138, 140 and 142 are amplified versions of the difference between the input parameters and reference parameters generated at a control loop reference circuit 144. The output of amplifiers 138, 140 and 142 are wire-anded in a junction 145 to group the error control signals together. The error control signal is then buffered with op-amp 146 to produce voltage error output signal Verr. Preferably, voltage error output signal Verr operates as a feedback signal that is indicative of one or more parameters in the power supply for indicating operational conditions.

Voltage error signal Verr is conditioned for a bandwidth and loop response time with respect to the control loop that includes charge control circuitry 130 and adapter 100. Typically, the error control loop response is conditioned to have a low bandwidth with a slow response. These conditions permit control circuit 130, when connected to adapter 100 in a closed loop configuration, to provide an appropriate control and response to widely varying power demands or loads, and still maintain a good margin of stability.

In certain circumstances, it is desirable to have an increased speed of response for the overall power supply system, which indicates that the control loop between charge control loop 130 and adapter 100 should have a faster response time. For example, if the system experiences high frequency transients over a short period of time, it is desirable to have the system react to and compensate the transient events as rapidly as feasible. In accordance with the present invention, a variable speed loop response is provided in charge control circuit 130.

The present invention is illustrated with respect to an internal control loop provided in charge control circuit 130. The control loop for generation of an error signal includes resistor R1, the value of which contributes to the setting of the main low frequency pole for the control loop. Typically, the value of resistor R1 is set so that the main low frequency pole of the control loop provides a slow response with low bandwidth to maintain margins of stability that are sufficient to handle widely varying loads. Preferably, the output of resistor R1 is a parametric signal indicative of an operating condition of the power supply. In accordance with a preferred embodiment of the present invention, the presence of transients is detected and the control loop is modified with respects to bandwidth and response time by bypassing the main low frequency pole in the compensation network. Switch S1 is controlled by feed forward logic 150 to couple resistor RFast in parallel with resistor R1 to reduce the composite resistor value in the control loop compensation to speed the response of the control loop and provide a wider bandwidth. Resistor RFast can be placed in parallel with resistor R1 on a temporary basis or according to a control algorithm that is dependant upon an error signal range or corresponding transient characteristics.

Switch S1 may be operated by feed forward logic 150 according to a number of algorithms or design criteria that can balance stability concerns with robust transient response. For example, feed forward logic 150 can detect when error signal Verr is outside a given range and change switch S1 to a conducting state to increase the control loop response speed. Feed forward logic 150 can also contain counting and/or timing logic to change switch S1 between conducting and non-conducting states dependent upon a length of time a transient interval lasts or perceived stability of the power control system. For example, feed forward logic 150 can determine whether error signal Verr is converging towards a desired value or range, and operates switch S1 accordingly. Additionally, the resistor RFast, switch S1, and feed forward logic 150 can comprise at least a portion of a response speed control circuit.

A preferred embodiment of the present invention detects the occurrence of a transient by monitoring error signal Verr and comparing the value of signal Verr to a given range or set of thresholds. If signal Verr is out of given range or beyond a given threshold, feed forward logic 150 can operate switch S1 to be in a conducting state to increase the controller response speed to drive signal Verr to a desired value faster than otherwise would be possible. It should be apparent that other parametric signals besides or in addition to Verr may be used in this control. However, in this embodiment the measured signal is used to make the response change determination, which in turn acts on the measured signal.

Operation of switch S1 in a conducting state may cause the power supply system to approach regions of operation where instability may occur. For example, load changes may occur during a transient that may provoke instability in the faster response time system provided with the closure of switch S1. Feed forward logic 150 provides circuitry that can detect if error signal Verr is non-converging, or indicating stability problems in the operation of the power supply system. In such a situation, feed forward control logic 150 can open switch S1 to improve the stability of the power supply system and continue to monitor the convergence of error signal Verr. If a lack of convergence is detected over a period of time as measured by feed forward control logic 150, switch S1 may be closed again for a period of time to improve control loop response time to contribute to driving error signal Verr to a desired value. If closure of switch S1 provokes additional instability, as indicated by the value of error signal Verr, feed forward logic 150 can again open switch S1 based on a given criteria, such as a period of time, or range of operation outside of desired limits. Accordingly, the overall function of feed forward logic 150 is to operate switch S1 to improve system response in the presence of transients while maintaining a degree of stability in the operation of the power supply.

Figure 3:
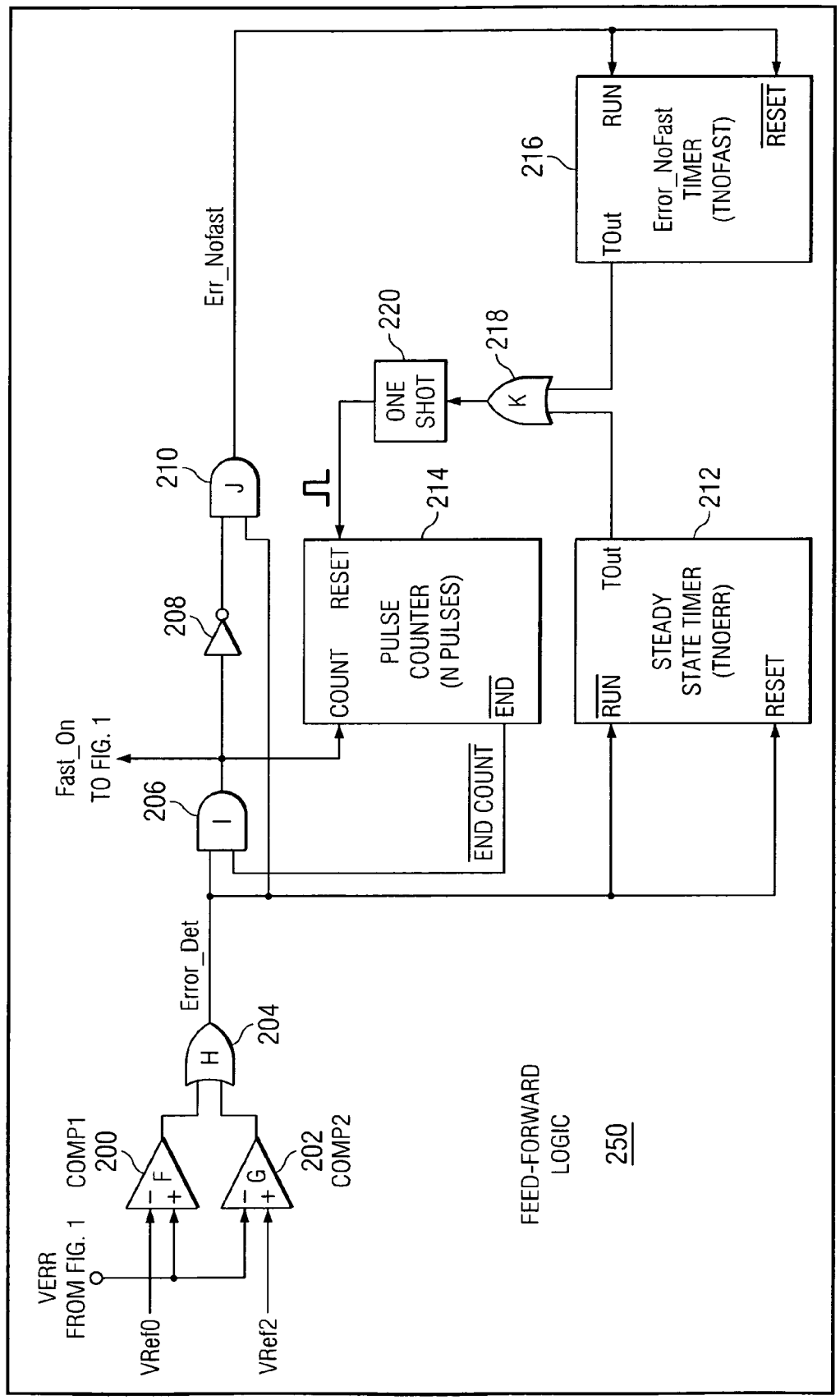
FIG. 3 is a circuit block diagram illustrating feed forward loop control in accordance with the present invention.

Referring now to FIG. 3, a block diagram 250 illustrates an embodiment of the operation of feed forward logic 150. Diagram 250 includes an input error signal Verr, and an output Fast_On used to drive switch S1. Error signal Verr is applied to comparators 200 and 202 to determine whether the value of error signal Verr falls within a given window, or within certain prespecified thresholds. Comparators 200 and 202 include reference inputs VRef0 and VRef2 that contribute to determining when error signal Verr is outside a desired range. Reference values VRef0 and VRef2 can be programmable so that different threshold or operating ranges may be set depending upon the application at hand. When the value of error signal Verr is outside the desired range, or beyond the particular thresholds set by VRef0 and VRef2, the outputs of comparator 200 or comparator 202 are activated indicating the detection of a transient, or operating parameters outside of an acceptable or expected range. In such a situation, signal Error_Det or error detection signal is active or high, to indicate that a fast controller response may be warranted. Comparators 200 and 202 may be provided as Schmidt trigger comparators that exhibit a certain amount of hysteresis to obtain a control parameter buffer that may reduce the impact of noise on the system, for example. When comparators 200 and 202 exhibit hysteresis, the outputs are not triggered until the input error signal falls within a given range of the respective input reference value. For example, in the case of comparator 202, the output remains high while error signal Verr has a value less than that of VRef2 plus a hysteretic tolerance. Comparator 202 does not switch in such a case until error signal Verr rises above the value of VRef2 plus the hysteretic tolerance value. Similarly, if error signal Verr is greater than the value of VRef0, and decreasing, comparator 200 does not switch until the value of error signal Verr is below the value of reference VRef0 minus a hysteretic tolerance value. The Schmidt trigger, or hysteresis functional comparator, improves the ability of the feed forward logic to respond to transients, where error signal Verr is very close to reference voltages VRef0 and VRef2 such as a few millivolts. The steady state error signal Verr may operate close to the value of VRef0 and VRef2 in many instances, since op-amp 152 has a very high gain and is very sensitive to changes in the error signal supplied from summer junction 145.

Figure 4:
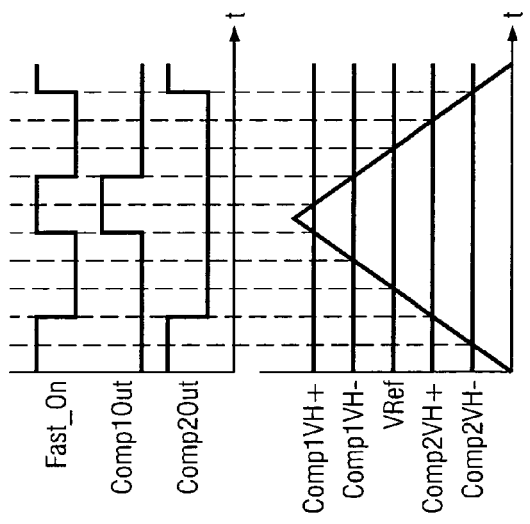
FIG. 4 is a timing diagram illustrating operating of the present invention.

Referring for a moment to FIG. 4, an exemplary timing diagram is illustrated to show how outputs of comparators 200, 202 change with varying input. FIG. 4 also illustrates the resulting signal Fast_On.

As discussed above, it is not desirable to maintain fast response switch S1 in a conducting state over a long period of time due to stability considerations. A pulse counter 214, that counts to a value N is used to disable fast response switch control signal Fast_On after it has been activated a number of times. Counter 214 is initialized or reset to enable activation of fast response switch control signal Fast_On. The reset action of counter 214 may be achieved according to a number of techniques, with timers being used in the embodiment illustrated in FIG. 3. Once counter 214 counts to N based on input pulses supplied by signal Fast_On, a count end output signal is provided to AND gate 206. The count end signal is active low, so that upon the completion of a counting sequence, the output of AND gate 206 is forced low to deactivate control signal Fast_On. Control signal Fast_On remains in this state until counter 214 is reset, driving the end count signal high, which re-enables AND gate 206.

It may be desirable to disable fast response control signal Fast_On for a period of time after an initial activation of Fast_On signal has been implemented. If control signal Fast_On is disabled and no further transients appear in the system over a given interval, then fast response control signal Fast_On is re-enabled. The interval over which no transients occur after fast response control signal Fast_On has been active is measured by timer 212. Timer 212 has a preset timing value, so that timer output TOut becomes active when a timer input signal is active for the preset period of time. Transient error indication signal Error_Det is applied to the input of timer 212 so that timer 212 is active when signal Error_Det is inactive or low. When signal Error_Det becomes inactive due to error signal Verr having a value within the predetermined ranges set by comparators 200 and 202, timer 212 begins to run. Once timer 212 times out at its preset time interval, counter 214 is reset. The reset or re-enable of pulse counter 214 re-enables fast response functionality for fast response switch S1. Accordingly, timer 212 provides a steady state time interval during which error signal Verr stays within the prespecified range determined by comparators 200 and 202. Timer 212 thus provides a stability function in that the fast response functionality is permitted once the system has stabilized with no detected errors for a given time interval, determined by the set point of timer 212.

While steady state timer 212 permits a fast response re-enable after system stability, timer 216 provides a fast response re-enable on the basis of a large error detected for a significant amount of time. That is, in the case of a large transient after the application of a fast response through closure of switch S1, the power supply system may not have completely recovered when switch S1 is opened to prevent further instability. Timer 216 re-enables operation of the fast response mode by permitting closure of fast response switch S1, if signal Error_Det is still active after the length of time indicated the set point in timer 216. Timer 216 effectively bypasses steady state timer 212 when a large transient error is detected for an excessive amount of time. In addition, timer 216 permits the reactivation of fast response switch S1 when a new transient occurs before the system has reached a steady state condition after a prior transient was detected and compensated.

Timers 212 and 216 both serve to reset counter 214 when they time out by activating a one-shot pulse generator 220. The pulse provided by one-shot generator 220 resents counter 214, which then enables the activation of fast response switch S1.

Pulse counter 214 provides a limitation on the number of activations of fast response switch S1 in a given time interval. For example, if error signal Verr falls in and out of range in a short time interval, pulse counter 214 reaches a maximum count, and sets output line END to an active low value, disabling further activity on fast response switch S1. With this functionality, pulse counter 214 essentially acts as a bandwidth limit for fast response switch S1, so that activation of switch S1 does not introduce a significant amount of instability in the control loop of the power supply.

However, in the event of a large or significant transient, it will be desirable to permit fast response switch S1 to be enabled and attempt to drive the error response to a desired steady state value quickly. Accordingly, steady state timer 212 and continuing error timer 216 are configured to provide a reset for pulse counter 214, so that fast response switch S1 can be re-enabled after a transient, or in the event that error signal Verr continues to fall outside of the voltage reference range. Timer 216 effectively bypasses the steady state timer 212 in the event a significant transient is detected for an excessive amount of time. Operation of timer 216 includes the event of new transients introduced into the system before the system reaches a steady state condition, or error signal Verr falls within the desired voltage reference range.

In a particular embodiment of the present invention, the reference for error signal Verr is 0 volts. VRef 0 is 70 millivolts, VRef 2 is −70 millivolts and each of the comparators 200, 202 exhibit a hysteresis of 30 millivolts. The pulse counter count value N is set to 4, and the timer intervals for timer 212 and 216 are both set to 400 milliseconds.

By modifying the loop response time of the charge control circuitry in accordance with a preferred embodiment of the present invention, an improvement of orders of magnitude can be obtained in performance with respect to voltage and current regulation. The switchable modification to the main control loop pole permits a fast response to transients in the system, while providing a good margin of stability for variable loads or demands on the power supply. A preferred embodiment of the present invention provides a response configuration that produces improved operation even in the presence of large transients, or transients with significant width. For example, the fast response control loop provided by a preferred embodiment of the present invention produces convergence even when a large transient appears in the system, because the fast response control is reset based on a convergence measurement from the feedback error signal. It should be apparent that a preferred embodiment of the present invention is not limited to power supply applications but can be applicable to any type of situation in which a variable response time is desired.

Although a preferred embodiment of the present invention has been described in relation to particular embodiments thereof, other variations and modifications and other uses will become apparent to those skilled in the art from the description. It is intended therefore, that the present invention not be limited by the specific disclosure herein, but to be given the full scope indicated by the appended claims.

What is claimed is:

1. A feedback control system for a power supply, comprising:
    an error amplifier that is adapted to generate an error signal;
    a compensation circuit coupled to the error amplifier to provide a power supply feedback control signal;
    a response speed control circuit that receives the error signal, wherein the response speed control circuit includes a switch coupled to the compensation circuit to modify a response speed of the compensation circuit.

2. The system according to claim 1, wherein the response speed control circuit further comprises:
    a plurality of comparators, wherein each comparator receives the error signal;
    a first logic gate that receives outputs from each comparator and that produces an error detection signal; and
    a second logic gate that receives the error detection signal that outputs a signal that closes the switch.

3. The system according to claim 1, wherein the compensation circuit further comprises an amplifier.

4. The system according to claim 1, wherein the system further comprises a plurality of error amplifiers, wherein the outputs of the error amplifiers are combined to generate the error signal.

5. A feedback control system for a power supply, comprising:
    an error amplifier that is adapted to generate an error signal;
    a compensation circuit coupled to the error amplifier to provide a power supply feedback control signal;
    a response speed control circuit that receives the error signal and that is adapted to modify a response speed of the compensation circuit, wherein the response speed control circuit includes a counter that records the number of times the response speed control circuit is active to modify the response speed of the compensation circuit.

6. The system according to claim 5, wherein the response speed control circuit further comprises:
    a plurality of comparators, wherein each comparator receives the error signal;
    a first logic gate that receives outputs from each comparator and that produces an error detection signal; and
    a second logic gate that receives the error detection signal and an output from the counter, wherein the second logic gate outputs a signal that modifies the response speed.

7. The system according to claim 5, wherein the compensation circuit further comprises an amplifier.

8. The system according to claim 5, wherein the system further comprises a plurality of error amplifiers, wherein the outputs of the error amplifiers are combined to generate the error signal.

9. A feedback control system for a power supply, comprising:
    an error amplifier;
    a first resistor that is coupled to the error amplifier;
    a second resistor that is coupled to the error amplifier;
    a switch that is coupled to the second resistor and that is coupled to the first resistor;
    feed forward logic that is coupled to the error amplifier, wherein the feed forward logic actuates and deactuates the switch based at least in part on an output from the error amplifier;
    a compensation amplifier that is coupled to the first resistor and to the switch; and
    a resistor-capacitor (RC) feedback network that is coupled to the compensation amplifier.

10. The system according to claim 9, wherein feed forward logic further comprises:
    a plurality of comparators, wherein each comparator is coupled to the error amplifier;
    an first OR gate that is coupled to each comparator;
    a counter;
    an first AND gate that is coupled to the counter and the first OR gate, wherein the first AND gate actuates and deactuates the switch;
    an inverter that is coupled to the first AND gate;
    a second AND gate that is coupled to the first OR gate and to the inverter;
    a first timer that is coupled to the first OR gate;
    a second timer that is coupled to the second AND gate;
    a second OR gate that is coupled to the first and second timers; and
    a one shot that is coupled between the second AND gate and the counter.

* * * * *

UNITED STATES PATENT AND TRADEMARK OFFICE
CERTIFICATE OF CORRECTION

PATENT NO.       : 7,595,619 B2
APPLICATION NO.  : 11/210235
DATED            : September 29, 2009
INVENTOR(S)      : Jose Antonio Vieira Formenti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this

Twenty-eighth Day of September, 2010

David J. Kappos
*Director of the United States Patent and Trademark Office*